United States Patent
Ohkawa et al.

(10) Patent No.: US 9,641,011 B2
(45) Date of Patent: May 2, 2017

(54) BATTERY CONTROL DEVICE ADAPTING THE BATTERY CURRENT LIMIT BY DECREASING THE STORED CURRENT LIMIT BY COMPARING IT WITH THE MEASURED BATTERY CURRENT

(75) Inventors: Keiichiro Ohkawa, Hitachinaka (JP); Ryouhei Nakao, Tokyo (JP); Youhei Kawahara, Tokyo (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 468 days.

(21) Appl. No.: 14/124,977

(22) PCT Filed: Jun. 10, 2011

(86) PCT No.: PCT/JP2011/063357
§ 371 (c)(1),
(2), (4) Date: Mar. 14, 2014

(87) PCT Pub. No.: WO2012/169062
PCT Pub. Date: Dec. 13, 2012

(65) Prior Publication Data
US 2014/0184166 A1  Jul. 3, 2014

(51) Int. Cl.
*H02J 7/00* (2006.01)
*H01M 10/44* (2006.01)
(Continued)

(52) U.S. Cl.
CPC ............ *H02J 7/007* (2013.01); *B60L 3/0046* (2013.01); *B60L 3/12* (2013.01); *B60L 11/1853* (2013.01);
(Continued)

(58) Field of Classification Search
CPC ...... H01M 10/441; H02J 7/007; H02J 7/0077; H02J 7/0088; H02J 7/0073; H02J 7/041; H02J 7/044; H02J 7/045
(Continued)

(56) References Cited

U.S. PATENT DOCUMENTS

| 4,146,830 A | * | 3/1979 | Foster | H02J 7/008 320/160 |
| 4,396,880 A | * | 8/1983 | Windebank | H01M 10/44 320/156 |

(Continued)

FOREIGN PATENT DOCUMENTS

| DE | 102011054339 | * | 4/2012 | ......... G01R 31/3613 |
| JP | 2007159248 A | * | 6/2007 | |

(Continued)

OTHER PUBLICATIONS

"Relay-vs-Transistor," Thomas O & Leon Heller, Stack Exchange, Posted Feb. 13, 2011, Seen Sep. 3, 2016, electronics.stackexchange.com/questions/10092/relay-vs-transistor.*

(Continued)

*Primary Examiner* — Robert Grant
*Assistant Examiner* — John Trischler
(74) *Attorney, Agent, or Firm* — Volpe and Koenig, P.C.

(57) ABSTRACT

A battery control device capable of carrying out current limitation in consideration of constraints on other components than a battery main body is provided. A battery control device according to the invention has an average current table describing an average current allowed for each of plural time window widths, and limits a battery current in accordance with the description.

8 Claims, 13 Drawing Sheets

(51) Int. Cl.
*H02J 7/04* (2006.01)
*B60L 3/00* (2006.01)
*B60L 3/12* (2006.01)
*B60L 11/18* (2006.01)

(52) U.S. Cl.
CPC ....... *B60L 11/1861* (2013.01); *H01M 10/441* (2013.01); *H02J 7/0077* (2013.01); *H02J 7/0088* (2013.01); *H02J 7/044* (2013.01); *B60L 2240/545* (2013.01); *B60L 2240/547* (2013.01); *B60L 2240/549* (2013.01); *B60L 2240/80* (2013.01); *H02J 7/0029* (2013.01); *H02J 2007/0039* (2013.01); *Y02T 10/705* (2013.01); *Y02T 10/7011* (2013.01); *Y02T 10/7016* (2013.01); *Y02T 10/7044* (2013.01)

(58) Field of Classification Search
USPC ................................. 320/134, 136, 125, 160
See application file for complete search history.

(56) References Cited

U.S. PATENT DOCUMENTS

| | | | | |
|---|---|---|---|---|
| 4,433,294 A * | 2/1984 | Windebank | G01R 31/3627 | 320/162 |
| 4,445,911 A * | 5/1984 | Lind | B03C 3/66 | 323/903 |
| 4,737,702 A * | 4/1988 | Koenck | H02J 9/061 | 320/114 |
| 5,583,416 A * | 12/1996 | Klang | H01M 10/44 | 320/160 |
| 5,656,920 A * | 8/1997 | Cherng | B60L 11/1857 | 320/161 |
| 5,661,393 A * | 8/1997 | Sengupta | H02J 7/0078 | 320/146 |
| 5,666,044 A * | 9/1997 | Tuozzolo | G05F 1/573 | 323/273 |
| 5,710,506 A * | 1/1998 | Broell | H02J 7/0073 | 320/145 |
| 5,739,671 A * | 4/1998 | Hamada | G01R 31/3624 | 320/149 |
| 5,945,811 A * | 8/1999 | Hasegawa | H02J 7/0011 | 320/141 |
| 6,037,751 A * | 3/2000 | Klang | H01M 10/44 | 320/129 |
| 6,100,676 A * | 8/2000 | Burstein | H02M 3/157 | 323/283 |
| 6,144,185 A * | 11/2000 | Dougherty | G01R 31/3631 | 320/132 |
| 6,204,645 B1 * | 3/2001 | Cullen | G05F 1/67 | 320/102 |
| 6,414,465 B1 * | 7/2002 | Banks | H01M 10/48 | 320/118 |
| 6,437,540 B2 * | 8/2002 | Sonobe | H02J 7/0047 | 320/134 |
| 6,498,466 B1 * | 12/2002 | Edwards | H02M 3/33507 | 323/282 |
| 6,674,265 B2 * | 1/2004 | Yoshida | B60L 3/0046 | 320/125 |
| 7,019,472 B2 * | 3/2006 | Kayukawa | B60K 6/48 | 318/139 |
| 7,589,500 B2 * | 9/2009 | Johnson | B25F 5/00 | 320/114 |
| 7,622,894 B2 * | 11/2009 | Kawahara | G01R 31/3624 | 320/127 |
| 7,714,543 B2 * | 5/2010 | Yoshida | B60L 3/0038 | 320/134 |
| 7,786,702 B1 * | 8/2010 | Chait | H02J 7/0073 | 320/104 |
| 7,830,126 B2 * | 11/2010 | Kawahara | B60L 3/0046 | 320/104 |
| 7,898,217 B2 * | 3/2011 | Nate | H02J 7/0052 | 320/134 |
| 7,904,260 B2 * | 3/2011 | Burlak | H02H 3/12 | 307/52 |
| 7,944,190 B2 * | 5/2011 | Ozawa | H02J 7/0065 | 323/229 |
| 7,990,106 B2 * | 8/2011 | Hussain | H02J 7/045 | 320/128 |
| 8,054,045 B2 * | 11/2011 | Kawahara | G01R 31/3624 | 320/127 |
| 8,456,675 B2 * | 6/2013 | Sasagawa | G06F 3/1222 | 358/1.13 |
| 8,624,559 B2 * | 1/2014 | Syed | B60L 11/1851 | 320/149 |
| 8,818,598 B2 * | 8/2014 | Izumi | B60L 3/0046 | 318/139 |
| 8,822,067 B2 * | 9/2014 | Johnson | B25F 5/00 | 429/149 |
| 8,975,855 B2 * | 3/2015 | Gerdes | 318/254.1 | |
| 9,112,248 B2 * | 8/2015 | Johnson | B25F 5/00 | |
| 9,203,248 B2 * | 12/2015 | Ohkawa | B60L 3/0046 | |
| 2001/0011883 A1 | 8/2001 | Sonobe | H02J 7/0029 | 320/134 |
| 2002/0008523 A1 * | 1/2002 | Klang | G01R 31/3631 | 324/429 |
| 2002/0027758 A1 * | 3/2002 | Oglesbee | G05F 1/565 | 361/104 |
| 2003/0052647 A1 * | 3/2003 | Yoshida | B60L 3/0046 | 320/125 |
| 2003/0107359 A1 * | 6/2003 | Balakrishnan | H02M 1/32 | 323/299 |
| 2003/0132738 A1 * | 7/2003 | Balakrishnan | H02M 3/156 | 323/282 |
| 2004/0070353 A1 * | 4/2004 | Kayukawa | B60K 6/48 | 318/139 |
| 2004/0130297 A1 * | 7/2004 | Baeuerlein | G01R 31/3662 | 320/137 |
| 2005/0151508 A1 * | 7/2005 | Cook | H02J 7/1423 | 320/116 |
| 2007/0132456 A1 * | 6/2007 | Salman | G01N 27/045 | 324/426 |
| 2007/0247106 A1 * | 10/2007 | Kawahara | B60L 3/0046 | 320/104 |
| 2008/0036419 A1 * | 2/2008 | Cook | H02J 7/0031 | 320/104 |
| 2008/0048619 A1 * | 2/2008 | Yoshida | B60L 3/0038 | 320/134 |
| 2008/0052550 A1 * | 2/2008 | Ozawa | H02J 7/0065 | 713/340 |
| 2008/0246447 A1 * | 10/2008 | Djenguerian | H02M 3/33523 | 323/234 |
| 2008/0258688 A1 * | 10/2008 | Hussain | H02J 7/06 | 320/145 |
| 2008/0297118 A1 | 12/2008 | Honma et al. | | |
| 2008/0297121 A1 * | 12/2008 | Matsuda | G05F 1/62 | 323/220 |
| 2009/0091296 A1 * | 4/2009 | Desprez | H01M 10/0525 | 320/134 |
| 2009/0195211 A1 * | 8/2009 | Wang | G01R 31/3679 | 320/136 |
| 2009/0315403 A1 * | 12/2009 | Ichikawa | B60L 3/0046 | 307/82 |
| 2010/0030499 A1 * | 2/2010 | Kawahara | G01R 31/3624 | 702/63 |
| 2011/0051180 A1 * | 3/2011 | Sasagawa | G06F 3/1222 | 358/1.15 |
| 2011/0270477 A1 * | 11/2011 | Ueki | H01M 10/0525 | 701/22 |
| 2012/0091971 A1 * | 4/2012 | Syed | B60L 11/1851 | 320/162 |
| 2012/0101753 A1 * | 4/2012 | Lin | H01M 10/48 | 702/63 |
| 2013/0096760 A1 * | 4/2013 | Izumi | B60L 3/0046 | 701/22 |
| 2013/0249500 A1 * | 9/2013 | He | H01M 10/44 | 320/162 |
| 2013/0271148 A1 * | 10/2013 | Maeda | B60L 3/0046 | 324/426 |

(56) References Cited

U.S. PATENT DOCUMENTS

| | | | | |
|---|---|---|---|---|
| 2013/0278221 A1* | 10/2013 | Maeda | ............... | B60L 3/0046 |
| | | | | 320/134 |
| 2013/0285617 A1* | 10/2013 | Butzmann | ............ | H02J 7/0063 |
| | | | | 320/135 |
| 2014/0339891 A1* | 11/2014 | Ohkawa | ............... | H01M 10/44 |
| | | | | 307/9.1 |

FOREIGN PATENT DOCUMENTS

| | | | |
|---|---|---|---|
| JP | 2007-288906 A | 11/2007 | |
| JP | 2008-301638 A | 12/2008 | |
| JP | 2009-207312 A | 9/2009 | |
| JP | 2010-256323 A | 11/2010 | |
| JP | WO 2012091077 A1 * | 7/2012 | ............ B60L 3/0046 |

OTHER PUBLICATIONS

Japanese Office Action, Japanese Patent Appln. No. 2013-519327, Nov. 11, 2014, 4 pgs.

\* cited by examiner

BATTERY CONTROL DEVICE ADAPTING THE BATTERY CURRENT LIMIT BY DECREASING THE STORED CURRENT LIMIT BY COMPARING IT WITH THE MEASURED BATTERY CURRENT

TECHNICAL FIELD

The present invention relates to a technique of controlling a battery.

BACKGROUND ART

A vehicle which travels using electricity as motive power is equipped with a rechargeable battery such as a lead battery, nickel-hydrogen battery or lithium-ion battery. Electric power required for a hybrid vehicle or an electric vehicle to travel is provided by these rechargeable batteries.

The following PTL 1 discloses a technique in which a time average value of the square value of charge and discharge current is compared with a threshold value and a limit value is set, as a technique for properly setting an input limit and an output limit of a battery.

CITATION LIST

Patent Literature

PTL 1: JP-A-2007-288906

SUMMARY OF INVENTION

Technical Problem

The technique disclosed in the above PTL 1 realizes proper setting of input and output limits of the battery. However, in practice, there are a plurality of components constituting the battery other than a battery main body and these components may have different current limit values from each other. In order to use the battery more optimally, it is desirable to set a current limit value for each component constituting the battery and use the battery within this range.

In order to solve the foregoing problem, an object of the invention is to provide a battery control device capable of implementing current limitation in consideration of the constraints on components other than the battery main body.

Solution to Problem

A battery control device according to the invention includes an allowable average current table which describes an average current value allowed for each of the plurality of time window widths, corresponding to each time window width, wherein a battery current is limited according to the description.

Advantageous Effect of Invention

With the battery control device according to the invention, the battery current can be controlled in consideration of the current limitation on each component connected to the battery.

DESCRIPTION OF EMBODIMENTS

Hereinafter, embodiments of the invention will be described with reference to the drawings. In the following embodiments, the case where the invention is applied to a battery system constituting the power supply of a plug-in hybrid vehicle (PHEV) is described as an example.

Also, in the following embodiments, the case where a lithium-ion battery is employed is described an example. However, other than that, a nickel-hydrogen battery, a lead battery, a hybrid capacitor or the like can also be used. Also, while single batteries are connected in series to form a battery pack in the following embodiments, single batteries connected in parallel may be connected in series to form a battery pack, or single batteries connected in series may be connected in parallel to form a battery pack.

Embodiment 1

System Configuration

Figure 1:
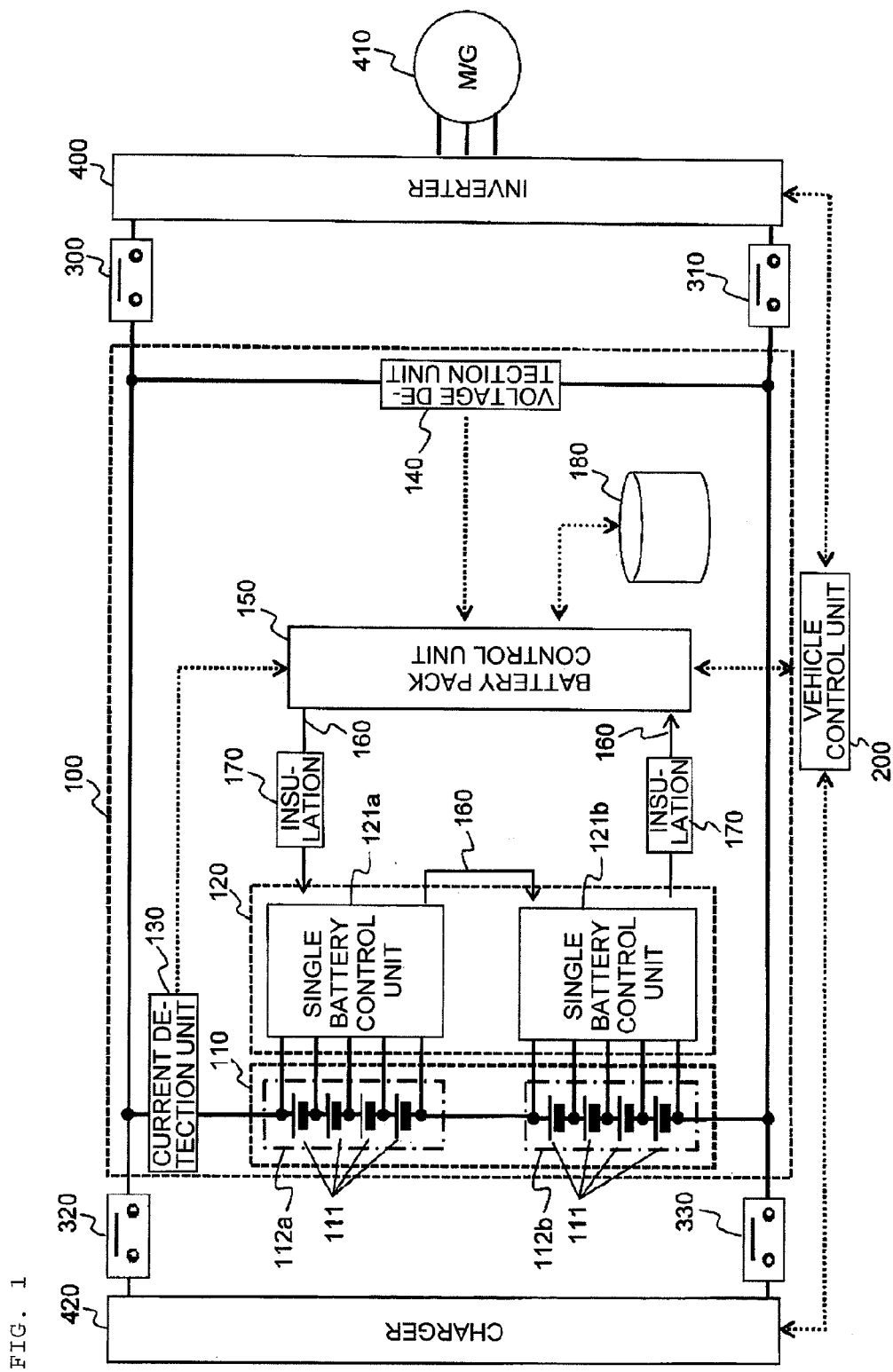
FIG. 1 is a view showing the configuration of a battery system 100 according to Embodiment 1 and the peripheries thereof.

FIG. 1 is a view showing the configuration of a battery system 100 according to Embodiment 1 of the invention and the peripheries thereof. The battery system 100 is connected to an inverter 400 via relays 300 and 310 and connected to a charger 420 via relays 320 and 330. The battery system 100 includes a battery pack 110, a single battery management unit 120, a current detection unit 130, a voltage detection unit 140, a battery pack control unit 150, and a storage unit 180.

The battery pack 110 is made up of a plurality of single batteries 111. The single battery management unit 120 monitors the state of the single batteries 111. The current detection unit 130 detects a current flowing through the battery system 100. The voltage detection unit 140 detects a total voltage of the battery pack 110. The battery pack control unit 150 controls the battery pack 110.

The battery pack control unit 150 receives the battery voltage and temperature sent from the single battery management unit 120, the current value flowing through the battery system 100 sent from the current detection unit 130, and the total voltage value of the battery pack 110 sent from the voltage detection unit 140. The battery pack control unit 150 detects the state of the battery pack 110 based on the received information. The result of the state detection by the battery pack control unit 150 is transmitted to the single battery management unit 120 and a vehicle control unit 200.

The battery pack 110 is made up of the a plurality of single batteries 111 electrically connected in series, the single batteries 111 being capable of storing and discharging electrical energy (DC power charge and discharge). The single batteries 111 forming the battery pack 110 are grouped by predetermined number of units, in order to implement management and control of the state. The grouped single batteries 111 are connected electrically in series, thus forming single battery groups 112a, 112b. The number of single batteries 111 forming the single battery group 112 may be the same in all the single battery groups 112. Alternatively, the single battery groups 112 may have different numbers of single batteries 111 from each other.

The single battery management unit 120 monitors the state of the single batteries 111 forming the battery pack 110. The single battery management unit 120 has a single battery control unit 121 provided in each single battery group 112. In FIG. 1, single battery control units 121a and 121b are provided corresponding to the single battery groups 112a and 112b. The single battery control unit 121 monitors and controls the state of the single batteries 111 forming the single battery group 112.

In this Embodiment 1, to simply the explanation, four single batteries 111 are connected electrically in series to form the single battery groups 112a and 112b, and the single battery groups 112a and 112b are further connected electrically in series. Thus, the battery pack 110 having the eight single batteries 111 in total is provided.

The battery pack control unit 150 and the single battery management unit 120 send and receive signals via an insulation element 170 represented by a photocoupler, and signal communication means 160.

Communication means between the battery pack control unit 150, and the single battery control units 121a and 121b forming the single battery management unit 120, will be described. The single battery control units 121a and 121b are connected in series in order from the higher electric potential of the single battery groups 112a and 112b monitored by the single battery control units, respectively. A signal sent from the battery pack control unit 150 to the single battery management unit 120 is inputted to the single battery control unit 121a via the insulation element 170 and the signal communication means 160. An output from the single battery control unit 121a is input to the single battery control unit 121b via the signal communication means 160, and an output from the lowest-order single battery control unit 121b is transmitted to the battery pack control unit 150 via the insulation element 170 and the signal communication means 160. In this Embodiment 1, the insulation element 170 does not exist between the single battery control unit 121a and the single battery control unit 121b. However, signals can also be sent and received via the insulation element 170.

The storage unit 180 stores information such as the internal resistance characteristic, capacity on full-charge, polarization voltage, deterioration characteristic, individual difference information, and correspondence between SOC and open circuit voltage (OCV), of the battery pack 110, the single batteries 111 and the single battery groups 112. Moreover, characteristic information of the single battery management unit 120, the single battery control units 121 and the battery pack control unit 150 can also be stored in advance. The information stored in the storage unit 180 will be explained later with reference to FIGS. 4, 6 and 7.

The battery pack control unit 150 executes arithmetic operation or the like to control the SOC, deterioration state (SOH: state of health), current and power available for charge and discharge (hereinafter, a positive value on the charging side and a negative value on the discharging side), abnormal state, and amount of charge and discharge, of one or more single batteries 111, by using information received from the single battery management unit 120, the current detection unit 130, the voltage detection unit 140 and the vehicle control unit 200, and a SOC table 181 and an internal resistance table 182, later described. Then, based on the result of the arithmetic operation, the battery pack control unit 150 outputs information to the single battery management unit 120 and the vehicle control unit 200.

The vehicle control unit 200 controls the inverter 400 connected to the battery system 100 via the relays 300 and 310, using the information sent from the battery pack control unit 150. Also, the vehicle control unit 200 controls the charger 420 connected to the battery system 100 via the relays 320 and 330. While the vehicle is traveling, the battery system 100 is connected to the inverter 400 and drives a motor generator 410, using energy stored in the battery pack 100. At the time of charging, the battery system 100 is connected to the charger 420 and is charged with the supply of power from a household power supply or a charging station.

The charger 420 is used to charge the battery pack 110, using an external power supply represented by a household power supply or a charging station. In this Embodiment 1, the charger 420 is configured to control charging voltage, charging current and the like, based on a command from the vehicle control unit 200. However, the charger 420 may carry out control based on a command from the battery pack control unit 150. Also, the charger 420 may be installed inside the vehicle or may be installed outside the vehicle, depending on the configuration of the vehicle, the performance of the charger 420, purpose of use, installation conditions of an external power supply, and the like.

When a vehicle system equipped with the battery system 100 starts up and travels, the battery system 100, under the control of the vehicle control unit 200, is connected to the inverter 400 and drives the motor generator 410 by using energy stored in the battery pack 110. At the time of regenerative operation, the battery pack 110 is charged with generated power from the motor generator 410. When the vehicle having the battery system 100 is connected to an external power supply represented by a household power supply or a charging station, the battery system 100 and the charger 420 are connected to each other based on information sent from the vehicle control unit 200, and the battery pack 110 is charged until a predetermined condition is achieved. The energy stored in the battery pack 110 through the charging is used at the next vehicle traveling and also used to operate electrical equipment or the like inside and outside the vehicle. Moreover, in some cases, the energy may be discharged to an external power supply represented by a household power supply, according to need.

Figure 2:
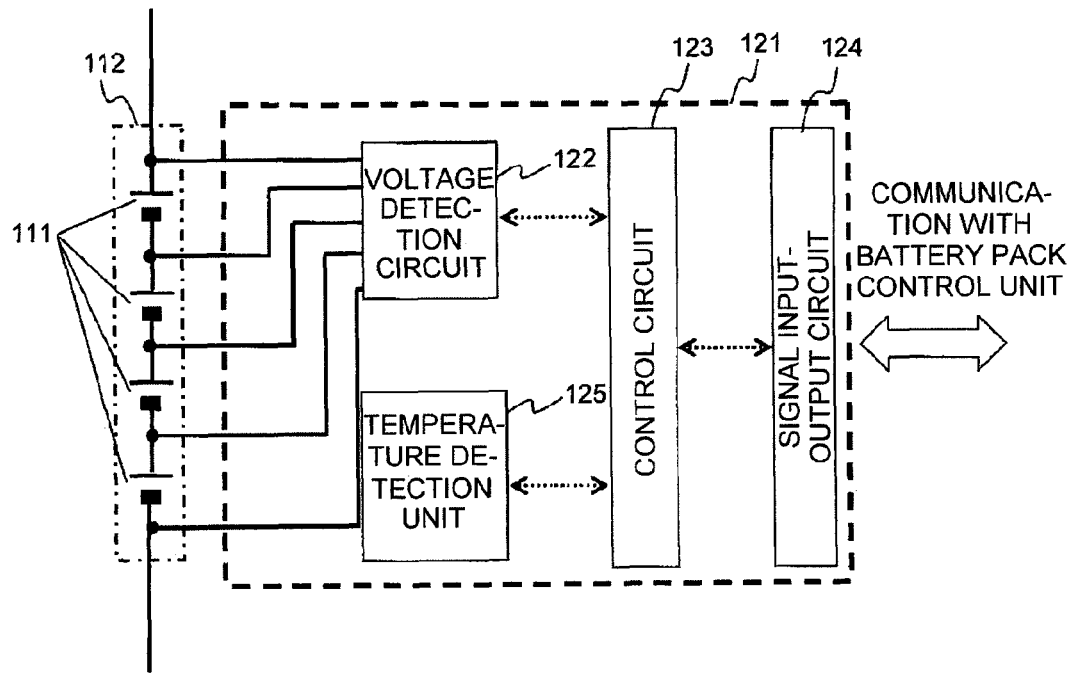
FIG. 2 is a view showing the circuit configuration of a single battery control unit 121.

FIG. 2 is a view showing the circuit configuration of the single battery control unit 121. The single battery control unit 121 has a voltage detection circuit 122, a control circuit 123, a signal input-output circuit 124, and a temperature detection unit 125. The voltage detection circuit 122 measures an inter-terminal voltage of each single battery 111. The control circuit 123 receives the results of measurement from the voltage detection circuit 122 and the temperature detection unit 125, and sends the results of measurement to the battery pack control unit 150 via the signal input-output circuit 124. By the way, a circuit configuration, typically installed in the single battery control unit 121, to equalize a variation in voltage and SOC between the single batteries 111 that is generated by a variation in self-discharge and current consumed or the like, is considered to be known and therefore the description thereof is omitted.

The temperature detection unit 125 provided in the single battery control unit 121 in FIG. 2 has a function of measuring the temperature of the single battery group 112. The temperature detection unit 125 measures the temperature of the entire single battery group 112 as one unit, and handles that temperature as a temperature representative value of the single batteries 111 forming the single battery group 112. The temperature measured by the temperature detection unit 125 is used for various arithmetic operations to detect the state of the single batteries 111, the single battery group 112, or the battery pack 110. In FIG. 2, on the assumption of this, one temperature detection unit 125 is provided in the single battery control unit 121. It is possible to provide the temperature detection unit 125 for each single battery 111, measure the temperature of each single battery 111, and execute various arithmetic operations based on the temperature of each single battery 111. However, in such a case, the configuration of the single battery control unit 121 becomes complex due to the increase in the number of temperature detection units 125.

FIG. 2 shows the temperature detection unit 125 in a simplified manner. In practice, a temperature sensor is installed on a temperature measurement target and temperature information is output as a voltage from the installed temperature sensor. The result of the measurement of the voltage is sent to the signal input-output circuit 124 via the control circuit 123. The signal input-output circuit 124 outputs the result of measurement to outside the single battery control unit 121. The function to realize this series of flows is installed as the temperature detection unit 125 in the single battery control unit 121. The voltage detection circuit 122 can also be used to measure the temperature information (voltage).

Figure 3:
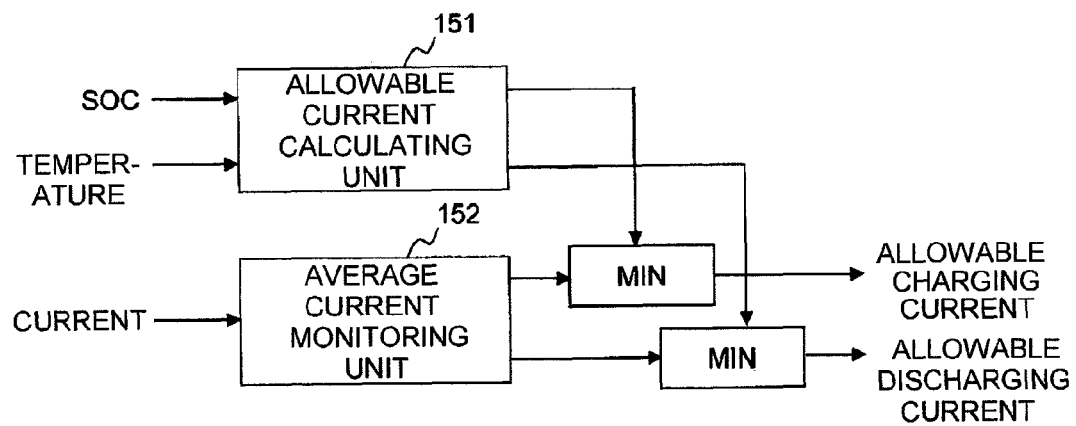
FIG. 3 is a view showing processing contents carried out by a battery pack control unit 150, in the form of a control block.

FIG. 3 is a control block showing an allowable current calculating unit 151 and an average current monitoring unit 152 for the battery pack control unit 150 to realize charge-discharge control of the battery pack 110. The SOC and temperature are input to the allowable current calculating unit 151. The current value flowing in and out of the battery pack 110 is used as an input to the average current monitoring unit 152. An output from the allowable current calculating unit 151 and an output from the average current monitoring unit 152 are compared with each other and the smaller value is output outside.

Hereinafter, a method for calculating the SOC that is used as an input to the allowable current calculating unit 151 will be described.

Figure 4:
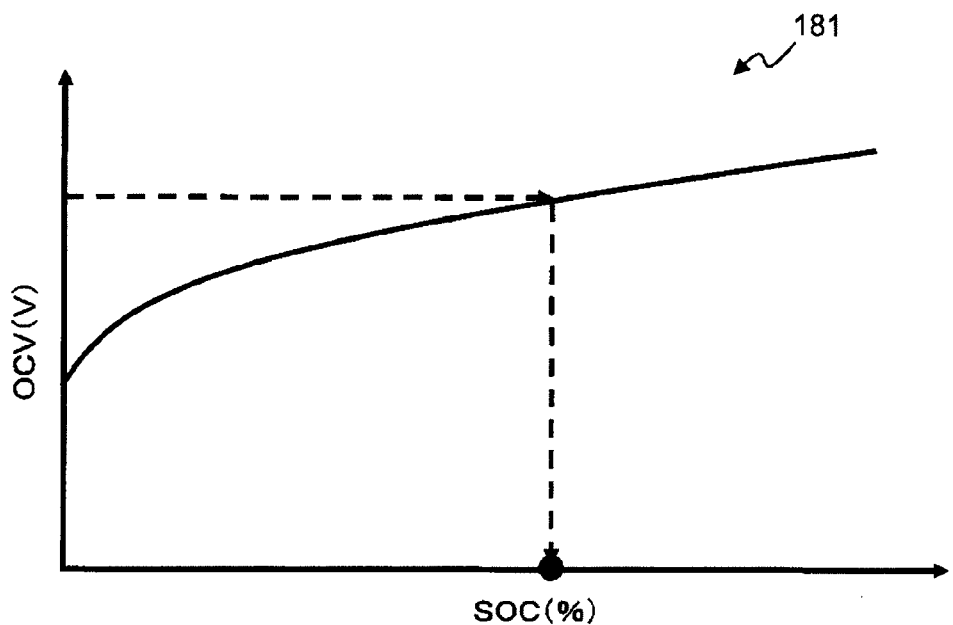
FIG. 4 is a view showing an example of an SOC table 181 stored in a storage unit 180.

FIG. 4 is a view showing an example of the SOC table 181 stored in the storage unit 180. The SOC table 181 is a data table describing the correspondence between the OCV of the single battery 111 and the SOC of the single battery 111. An arbitrary data format may be used. However, an example of data in a graph format is shown here for convenience of explanation. While a data table is used in this embodiment, the correspondence between OCV and SOC can also be expressed using a mathematical formula or the like. Any means that includes characteristic information representing the correspondence between OCV and SOC and that can be converted from OCV to SOC or from SOC to OCV may be used.

The OCV is the voltage of the single battery 111 with no load. The inter-terminal voltage of the single battery 111 that is measured at a timing such as before the relays 300, 310, 320, 330 close, or in the state where the relays 300, 310, 320, 330 are closed but charging or discharging of the battery pack 110 is not started, can be determined as OCV. Moreover, in the case where charging or discharging of the battery pack 110 is carried out but the current value is very weak, the voltage can be regarded as OCV.

If the current value flowing in and out of the single battery 111 is large, the internal resistance included in the single battery 111 causes a voltage fall or voltage rise that cannot be ignored. The battery voltage at this time is a closed circuit voltage (CCV), and under this condition, it is difficult for the single battery control unit 121 to directly grasp the OCV of the single battery 111. To acquire the OCV in this case, the battery pack control unit 150 needs to calculate the OCV according to the following formula 1, using the CCV of the single battery 111 measured by the single battery control unit 121 and a current I flowing in and out of the single battery 111 measured by the current detection unit 130, an internal resistance R of the single battery 111 that is stored in advance, and information about a polarization voltage Vp. The calculated OCV is entered into the table of FIG. 4, thus obtaining the SOC at each time point.

The calculation of the following formula 1 can be executed by the battery pack control unit 150, regardless of whether charging or discharging of the single battery 111 is carried out or not. The SOC is calculated for each single battery 111, using the OCV of each of the single batteries 111 forming the battery pack 110, or the like.

As another method for calculating the SOC, a method in which the current flowing in and out of the single battery 111 is integrated to obtain the SOC is known (SOC=initial SOC+100×∫Idt/full-charge capacity). In this embodiment, either SOC calculation method may be used. If calculation is done for each single battery 111, the SOC of each single battery 111 can be acquired. If calculation is done collectively for the entire battery pack 110, the average SOC of the single batteries 111 can be acquired.

To acquire the SOC of each single battery 111, if the CCV, R, Vp in the following formula 1 and the foregoing SOC calculation method in which the current is integrated to acquire the SOC are used, the initial SOC, the full-charge capacity and the like need to be prepared as calculation parameters for each single battery 111.

$$OCV = CCV - I \times R - Vp \quad (1)$$

The battery pack control unit 150 can acquire the SOC of the single battery 111 by using the OCV of the single battery 111 detected by the single battery control unit 121 and the SOC table 181. Also, the OCV of the battery pack 110 can be obtained by totaling the OCVs of the single batteries 111.

If the single batteries 111 have different SOC characteristics from each other, the SOC table 181 for each single battery 111 may be provided.

The allowable current calculating unit 151 shown in FIG. 3 will be described. The allowable current calculating unit 151 finds a current value (allowable current) at which the battery pack 110 can be charged and discharged to the maximum, using the foregoing SOC and temperature. The allowable charging current is small when the SOC is high, and large when the SOC is low. The allowable discharging current is large when the SOC is high, and small when the SOC is low. Also, the internal resistance of the single battery 111 has a temperature characteristic, and the internal resistance increases as temperature becomes lower. Therefore, the allowable charging and discharging currents are smaller as temperature becomes lower, and larger as temperature becomes higher.

Figure 5:
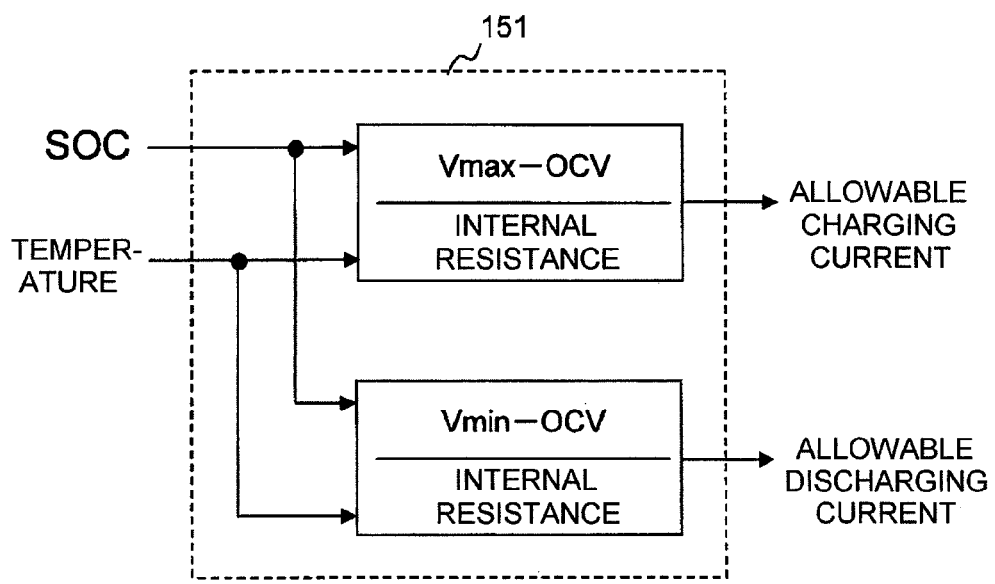
FIG. 5 is a view showing an allowable current calculating unit 151 provided in the battery pack control unit 150, in the form of a control block.
Figure 6:
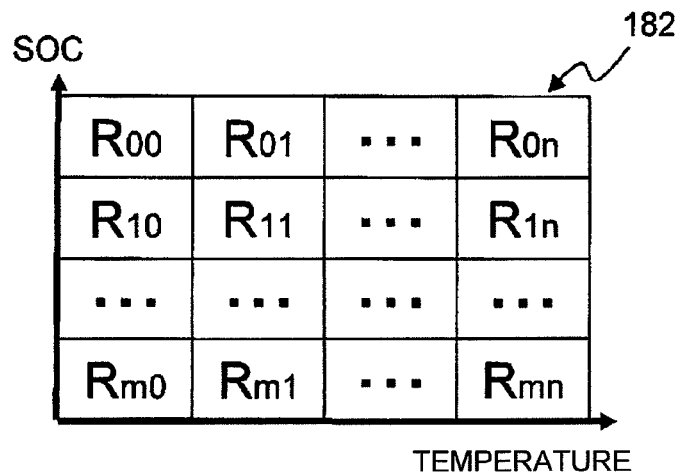
FIG. 6 is a view showing an example of an internal resistance table 182 stored in the storage unit 180.

FIG. 5 shows a control block showing the content of the arithmetic operation by the allowable current calculating unit 151. If a maximum terminal voltage of the single battery 111 is Vmax, the allowable charging current can be found with the following formula 2. The OCV in the formula 2 can use the result of calculation of the formula 1. Also, in the case where the current flowing in and out of the single battery 111 is integrated to obtain the SOC, the result of converting the SOC calculation result to the OCV on the SOC table 181 of FIG. 4 can be used. In FIG. 5, the case where the SOC is used as an input is shown as an example. The internal resistance value in the formula 2 can be acquired from a data table describing internal resistance values corresponding to the SOC and temperature, as shown in FIG. 6. While a data table is used in this embodiment, the correspondence between temperature, SOC and internal resistance may be expressed by different means than the data table, such as, a mathematical formula, as in the case of the SOC table 181 of FIG. 4. Any characteristic information of internal resistance corresponding to temperature and SOC can be used. When finding the allowable discharging current, a minimum terminal voltage Vmin may be used, as shown in the following formula 3. If the internal resistance value differs largely between charging and discharging, charge-discharge control of the battery pack 110 can be carried out based on more secure allowable charging and discharging currents by using different internal resistance values between the allowable charging current and the allowable discharging current.

$$\text{Allowable charging current} = (V\text{max} - OCV)/\text{internal resistance value} \quad (2)$$

$$\text{Allowable discharging current} = (V\text{min} - OCV)/\text{internal resistance value} \quad (3)$$

If the battery pack 110 is charged within the range of the allowable charging current and the battery pack 110 is discharged within the range of the allowable discharging current, the battery pack 110 can be charged and discharged without deviating from Vmax or Vmin. However, this allowable current is only for the purpose of containing the battery voltage within the range from Vmax to Vmin, and heat generation or the like due to charging and discharging is not taken into consideration at all. If the temperature of the single battery 111 rises, deterioration can proceed quickly. Other components constituting the battery system 100 other than the single batteries 111 may need to be managed in consideration of heat generation in some cases. That is, to use the battery system 100 optimally, a function of taking heat generation into consideration needs to be newly provided in addition to the allowable current calculating unit 151, and in this embodiment, the average current monitoring unit 152 shown in FIG. 3 is provided.

Figure 7:
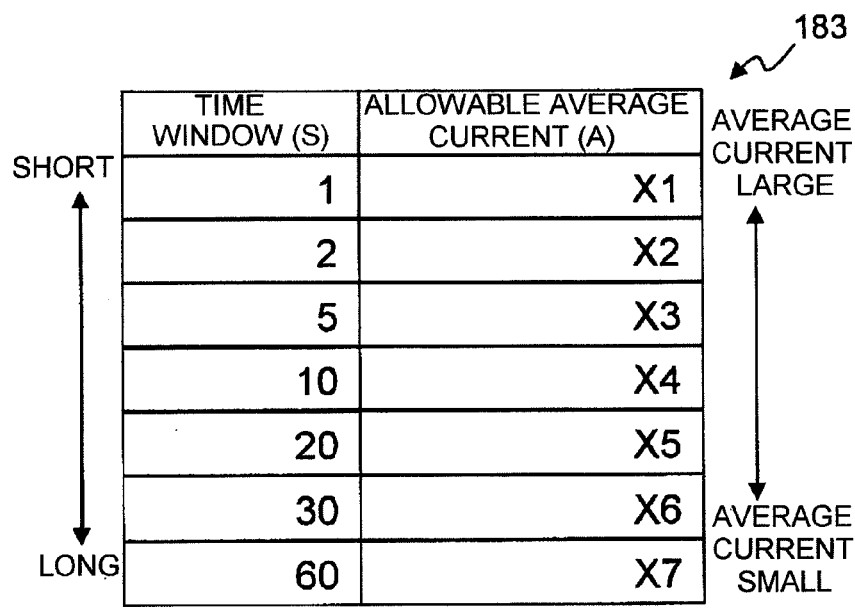
FIG. 7 is a view showing the configuration of an allowable average current table 183 stored in the storage unit 180.

The detailed processing content in the average current monitoring unit 152 will be described hereinafter. FIG. 7 shows the configuration of an allowable average current table 183 stored in the storage unit 180 and used by the average current monitoring unit 152, and an example of data therein. The allowable average current table 183 is a data table describing an average current allowed for each time window and can be said as a table describing a short-time rated current for each component constituting the battery system 100. There are characteristics according to each component, for example, that the short-time rated current is described as having a shorter time window width than in other components, or that the allowed average current value is larger than in other components. If this is put together with the time window and the allowed average current, the data table of FIG. 7 is obtained. However, the allowable average current need not necessarily be described for all the components. For example, the allowable average current may be described simply with respect to a component having a great need for implementing current limitation, or the allowable average current may be described with respect to each group of components gathered to a certain degree. Moreover, instead of the data table, another means such as a mathematical formula expressing the allowable average current corresponding to the time window can be used to store the information of the allowable average current in the storage unit 180.

Embodiment 1

Concept of System Operation

Figure 8:
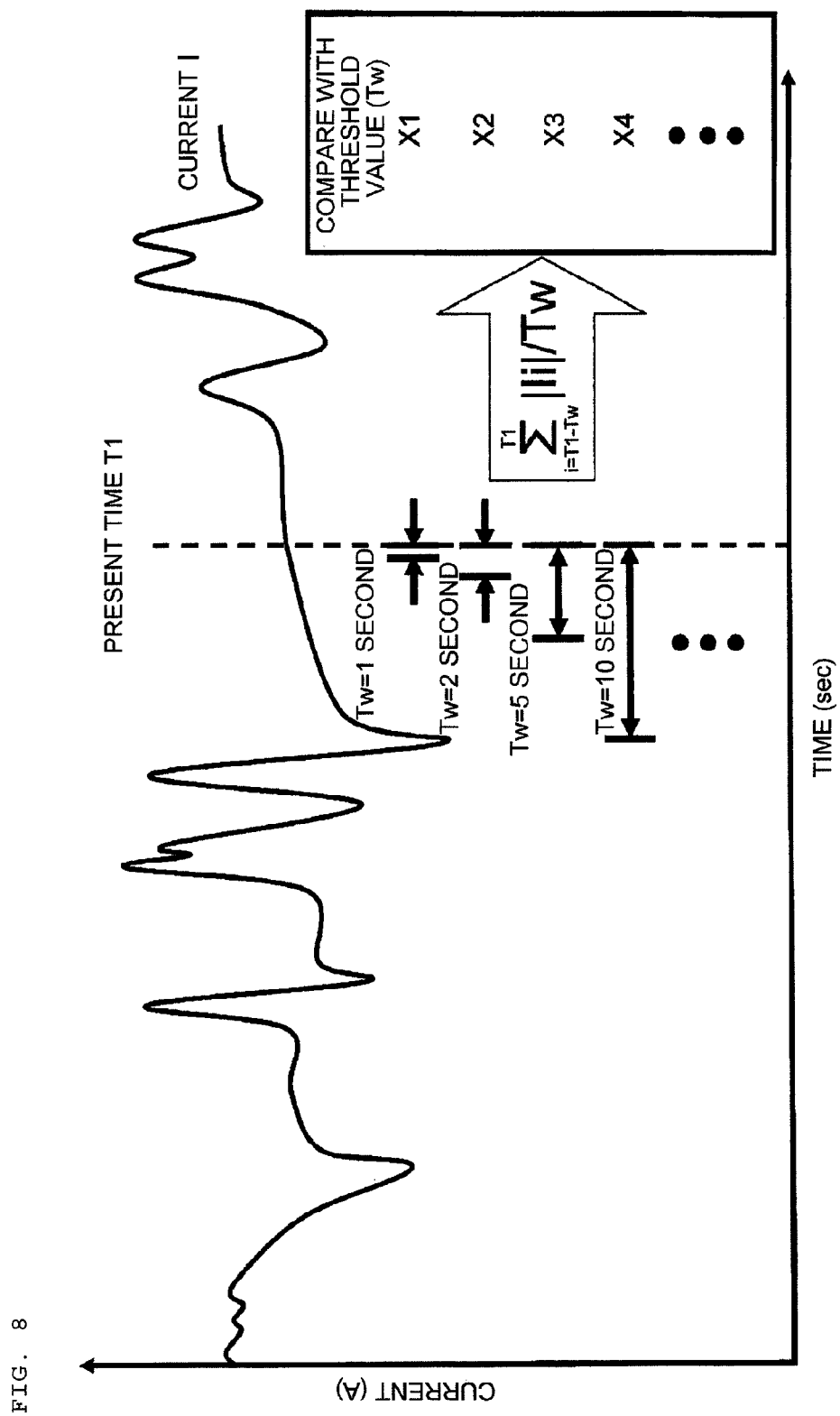
FIG. 8 is a view showing an image where the battery pack control unit 150 calculates an average current for each window width.

FIG. 8 is a view showing a processing content carried out by the average current monitoring unit 152 provided in the battery pack control unit 150. The average current monitoring unit 152 determines whether to limit the current at time T1, based on whether the average value of the absolute values of the currents flowing in and out of the battery pack 110, found retrospectively by the amount of the time window widths from the time T1, exceeds the allowable average current designated in the allowable average current table 183 or not.

The average current monitoring unit 152 finds the average value of the absolute values of the currents flowing in and out of the battery pack 110 in each time window width as viewed from the time T1, and compares the average value with the allowable average current corresponding to each time window width described in the allowable average current table 183. If the average current in one of the time window widths exceeds the corresponding allowable average current in the allowable average current table 183, limitation is implemented in such a way that the average current in the time window width falls below the allowable average current. If the allowable average current is exceeded in a plurality of time window widths, the smallest allowable average current is set as a current limit value, thus preferentially limiting the current.

Figure 9:
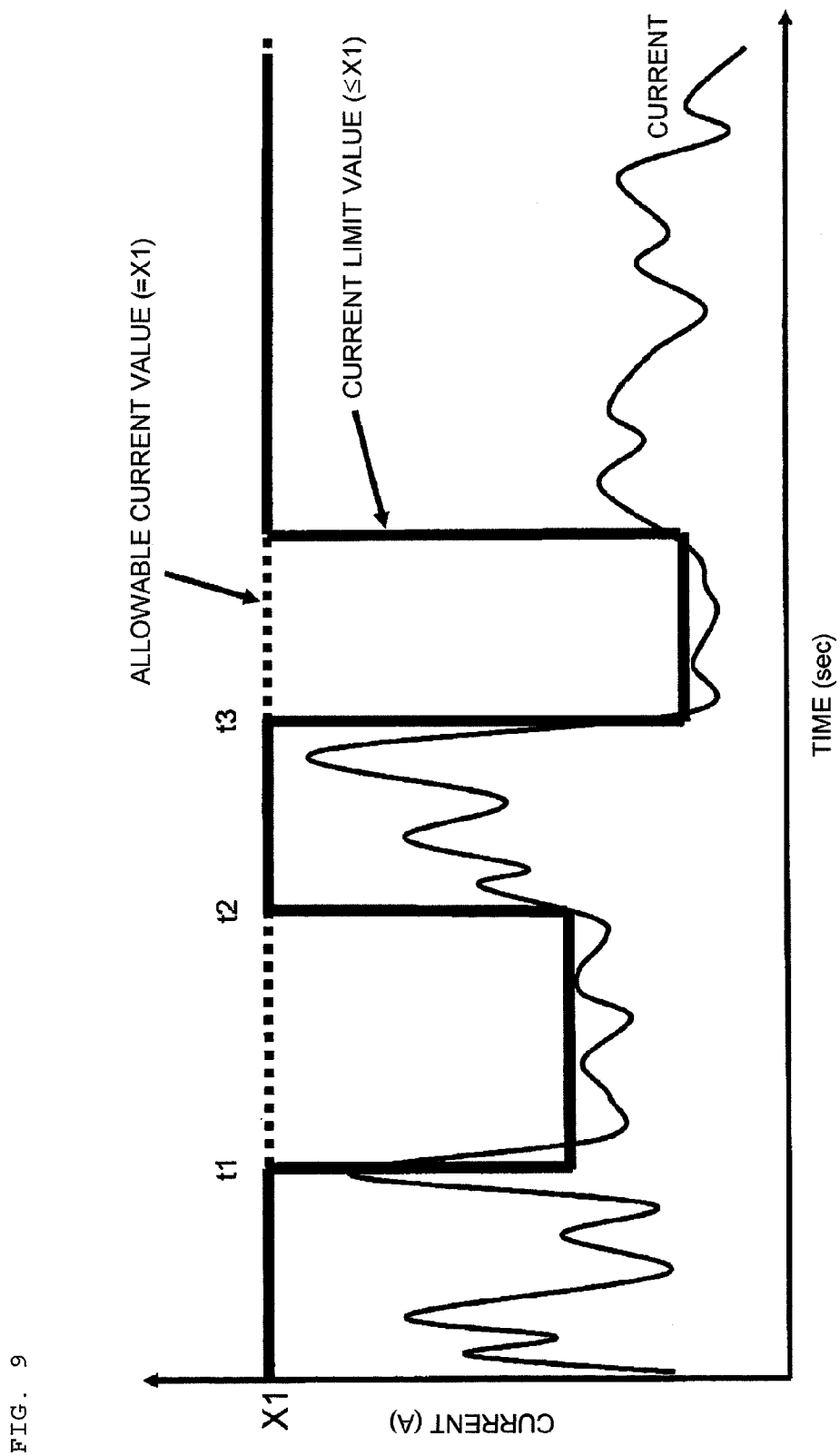
FIG. 9 is a view showing processing in which the battery pack control unit 150 limits a battery current.

FIG. 9 is a view showing the state where the average current monitoring unit 152 provided in the battery pack control unit 150 is limiting the current. Hereinafter, the operation at each time point will be described. Here, the result of the allowable current calculated by the allowable current calculating unit 151 is X1, which is an upper limit value for the battery pack 110. The initial value of the current limit value by the average current monitoring unit 152, too, is X1, which is the allowable average current corresponding to the shortest time window.

It is assumed that, at time t1, the average value of the absolute values of the currents flowing in and out of the battery pack 110 in a certain time window width exceeds the allowable average current corresponding to the time window width. The average current monitoring unit 152 carries out a limitation to set the exceeded allowable average current as a current limit value so that the average current becomes equal to or lower than the allowable average current. For example, if the allowable average current in a certain window width is 10 A and the average current in the same window width exceeds 10 A, it is determined that the allowable average current is exceeded, and the allowable average current 10 A is employed as a current limit value. If the allowable average current in a certain window width is 100 A and the average current in the same window width exceeds 100 A, 100 A is similarly used as a current limit value. As shown in FIG. 3, the final value of the allowable current outputted from the battery pack control unit 150 is the smaller one of the output from the allowable current calculating unit 151 and the output from the average current monitoring unit 152. Therefore, if the current limit value outputted from the average current monitoring unit 152 is below the allowable current value outputted from the allowable current calculating unit 151, the above current limit value is output as the final allowable current from the battery pack control unit 150, and based on this, the battery pack 110 has its charge and discharge controlled.

Figure 10:
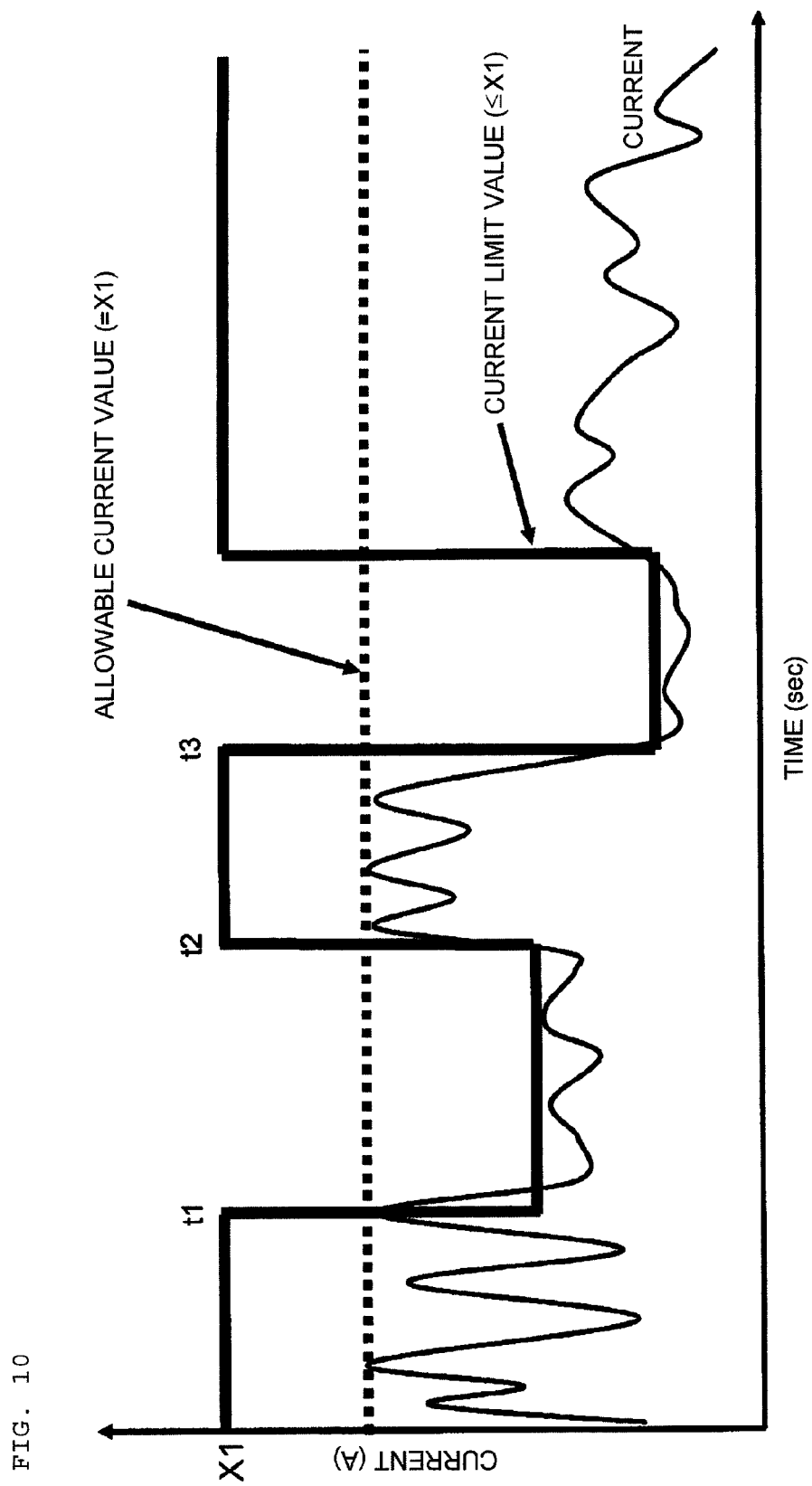
FIG. 10 is a view showing processing in which the battery pack control unit 150 limits the battery current.

It is assumed that, at time t2, the average currents in all the time window widths are equal to or below the allowable average current. The average current monitoring unit 152 determines that limitation need not be applied, returns the current limit value to the initial value (X1 corresponding to the shortest time window), and outputs X1 as an allowable current. Meanwhile, as shown in FIG. 10, in the state where the ambient temperature of the battery system 100 is low, the internal resistance of the single batteries 111 increases and therefore the output from the allowable current calculating unit 151 decreases. As the output of the allowable current from the battery pack control unit 150 in this state, the result in the allowable current calculating unit 151 is employed up to the time t1, and the current limit value from the allowable current monitoring unit 152 is employed from t1 to t2, whereas the output from the allowable current calculating unit 151 is employed again from t2 to t3. The battery pack control unit 150 subsequently carries out similar operations.

Embodiment 1

Operation Procedure of System

Hereinafter, an operation procedure for the battery system 100 to settle the current flowing through the battery pack 110 at or below the allowable average current will be described.

Step 1: Acquire the Average Current in Each Time Window Width

The battery pack control unit 150 acquires the current flowing through the battery pack 110 via the current detection unit 130, and finds the average current for each time window width using the technique described with reference to FIG. 8. Specifically, the time windows of 1 second, 2 seconds, 5 seconds, . . . 60 seconds shown in FIG. 7 are provided, and the average value of the absolute values of the charging and discharging currents of the battery pack 110 in the period tracing back from the current by the amount of the time window widths is found. Time history of the current flowing through the battery pack 110 may be stored and saved, for example, in the storage unit 180.

Step 2: Acquire the Allowable Average Current

The battery pack control unit 150 reads the allowable average current table 183 via the average current monitoring unit 152 and acquires the allowable average current in each time window width.

Step 3: Limit the Current Flowing Through the Battery Pack 110

The battery pack control unit 150 compares the average value of the absolute values of the currents flowing in and out of the battery pack 110 for each time window width found in Step 1, with the allowable average current in each time window width acquired in Step 2, and checks whether the average current is not above the allowable average current for each time window width. If the allowable average current in one of the time window widths is exceeded, the average current monitoring unit 152 employs the exceeded allowable average current as a current limit value. As described further in detail with reference to FIG. 11, in this case, it is detected at the time t1 that an average current Iave found with respect to the time window of 2 seconds exceeds a corresponding allowable average current X2, and therefore the average current monitoring unit 152 changes the current limit value to X2 at this time. If the average current found with respect to the time window of 5 seconds exceeds a corresponding allowable average current X3, the average current monitoring unit 152 changes the current limit value to X3. If the average current found with respect to the time window of 60 seconds exceeds an allowable average current X7, X7 is employed as the current limit value. The battery pack control unit 150 compares the current limit value set by the average current monitoring unit 152 with the output from the allowable current calculating unit 151 and employs the smaller value. Therefore, if the current limit value by the average current monitoring unit 152 becomes smaller, this is employed as the final allowable current value in the battery pack control unit 150 and the charging and discharging currents are thus limited. This step corresponds to the times t1 and t3 in FIG. 9.

Step 4: Recover from the Limitation on the Current Flowing Through the Battery Pack 110

The battery pack control unit 150 returns the current limit value in the average current monitoring unit 152 to the value preceding the limitation in Step 3, at the point when the average currents in all the time window widths settle at or below the allowable average current. This step corresponds to the time t2 in FIG. 9.

Step 5: Repeat the Foregoing Processing

The battery pack control unit 150 repeatedly executes the processing of the above Step 1 to Step 4 during the operation of the battery system 100. Thus, the average current in each time window width of the battery pack 110 can be settled within the range of the allowable average current.

Embodiment 1

Summary

As described above, the battery system 100 according to this Embodiment 1 has the allowable average current table 183 describing the allowable average current for each time window width, and based on the description, controls the battery current in such a way that the average value of the absolute values of the currents flowing in and out of the battery pack 110 in each time window width settles at the allowable average current for each time window width. Thus, the battery current can be controlled in consideration of the short-time rated current of the single batteries 111 provided in the battery system 100 or each component for forming the battery pack 110.

Embodiment 2

Figure 11:
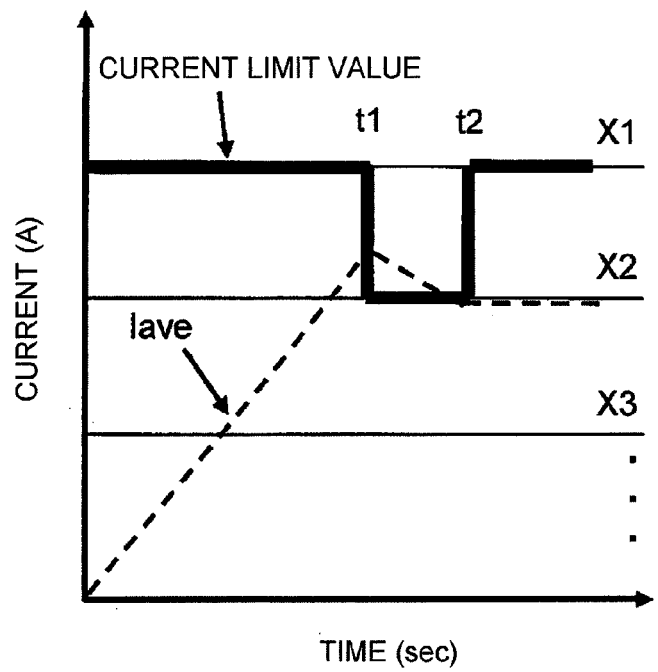
FIG. 11 is a view showing a process in which the battery pack control unit 150 changes a limit current.

In Embodiment 1, settling the average current for each time window width within the allowable range is described. As a specific technique thereof, the average current Iave is calculated in each window width and compared with the allowable average current corresponding to each window width, and if the calculated average current Iave exceeds the allowable average current, control to use the allowable average current as the current limit value is performed (FIG. 11). Here, if it is detected that the average current Iave exceeds the limit value, more optimal limitation processing can be realized by deciding a current limit value in consideration of the amount of the excess current.

Thus, in Embodiment 2 of the invention, a battery pack control unit 150 that sets a current limit value in consideration of the amount of excess if the average current Iave exceeds the allowable average current is proposed. The configuration of the battery system 100 is mostly similar to Embodiment 1. Therefore, hereinafter, different points will primarily be described.

Figure 12:
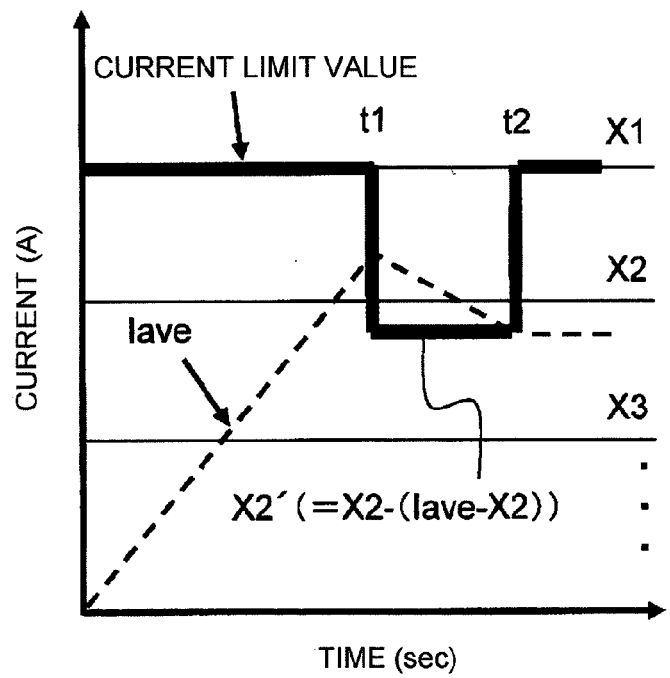
FIG. 12 is a view showing a process in which the battery pack control unit 150 changes the limit current.

FIG. 12 is a view showing a process in which the battery pack control unit 150 changes the current limit value of the battery current. FIG. 11 of Embodiment 1 describes that the average current monitoring unit 152 finds the average current Iave, for example, with respect to the time window of 2 seconds, and that the current limit value is switched from X1 to X2 if the average current exceeds the allowable average current X2. In this technique, the amount by which the average current Iave exceeds the allowable average current X2 cannot be reflected in the current limit value and the battery current cannot be limited securely. Thus, in this Embodiment 2, if the allowable average current X2 is exceeded, the current limit value is switched from X1 to X2 and the current limit value is changed by the amount of the excess.

The average current monitoring unit 152 provided in the battery pack control unit 150 finds the average value of the absolute values of the currents flowing in and out of the battery pack 110 for each time window width, and for example, if it is detected that the average current Iave found with respect to the time window of 2 seconds exceeds the allowable average current X2 corresponding to the time window of 2 seconds at the time t1, as shown in FIG. 12, the average current monitoring unit 152 finds a current limit value reflecting the amount by which the average current exceeds the allowable average current, as shown in the formula 4. By using the current limit value reflecting the excess of Iave over the allowable average current to limit the current value flowing in and out of the battery, charging and discharging of the battery pack 110 is controlled optimally.

$$X2'=X2-(Iave-X2) \quad (4)$$

Figure 14:
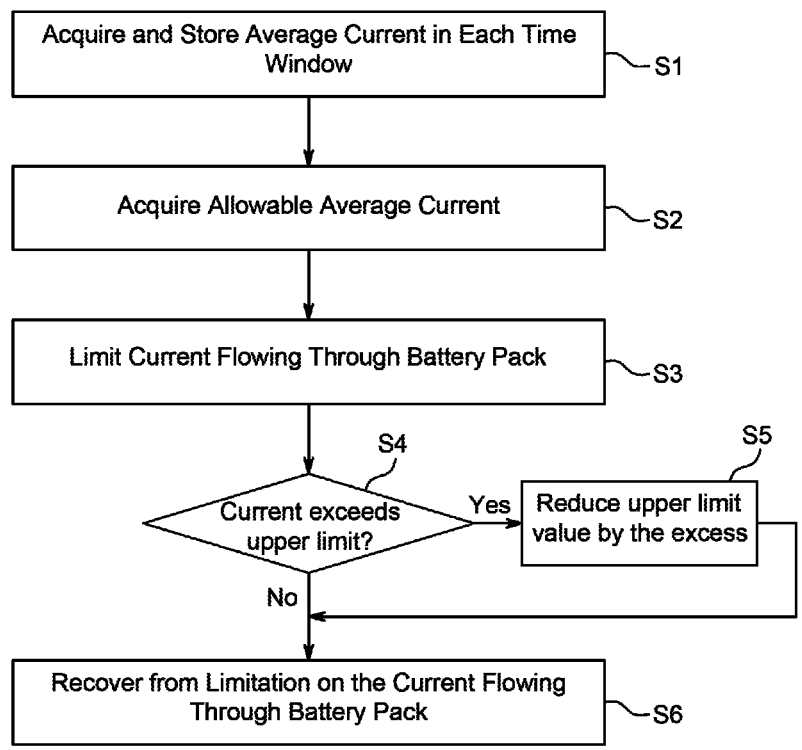
FIG. 14 is a flow diagram of the operation procedure in an embodiment of the invention.

FIG. 14 is a flow diagram of the method of operation of the system in accordance with an embodiment with the following steps. In step S1, the average current in each time window is acquired and stored, for example in the storage unit. In step S2, the allowable average current is acquired. In step S3, the current flowing through the battery pack is limited. In step S4, it is determined whether the current exceeds the upper limit. If so (S4=YES), in step S5, the upper limit value is reduced by the excess. If not (S4=NO), or after step S5, in step S6, recover from the limitation on the current flowing through the battery pack.

Figure 15A:
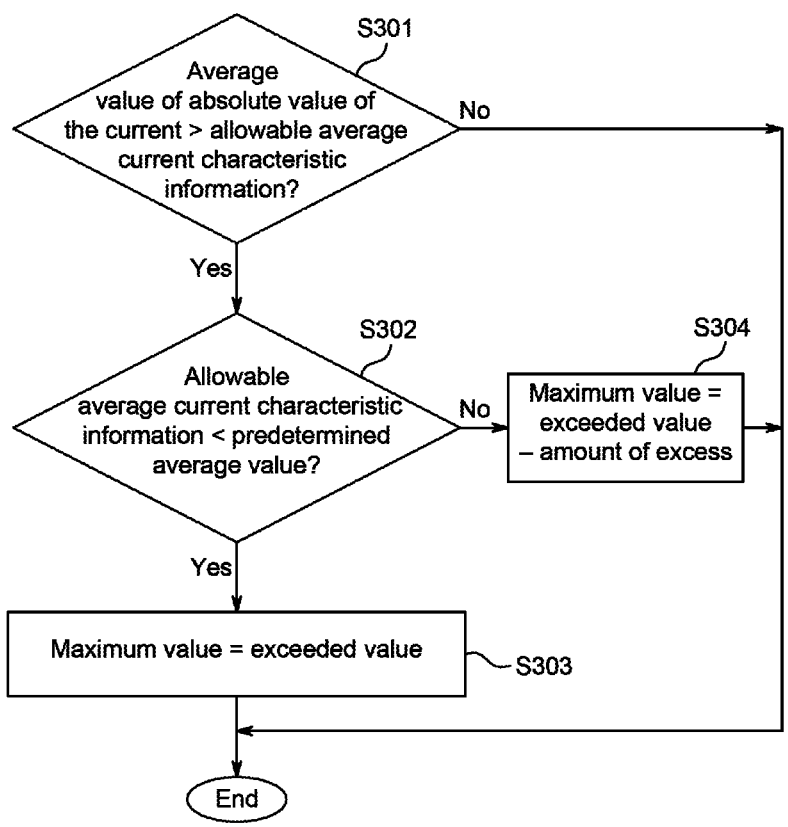
FIG. 15A and FIG. 15B are flow diagrams of one step of the operation procedure in the embodiment shown in FIG. 14.
Figure 15B:
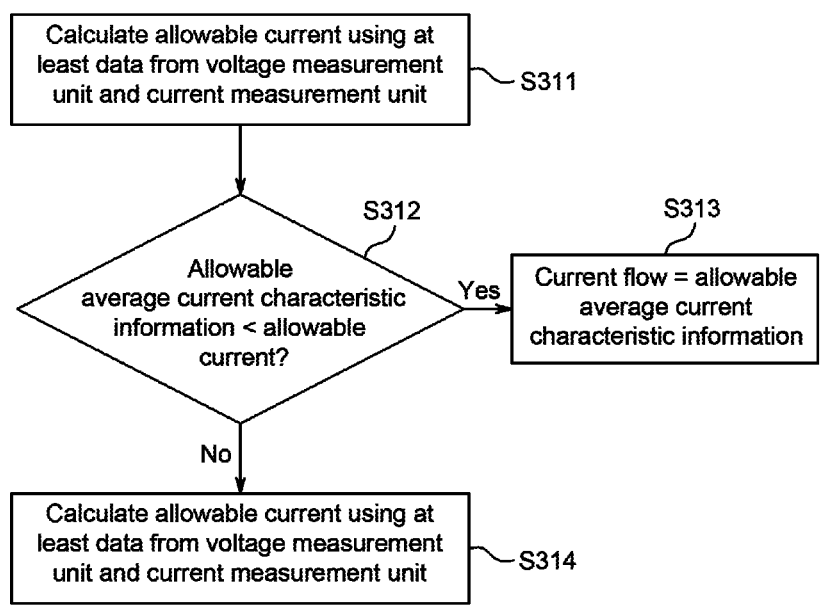

FIGS. 15A and 15B are embodiments of step 3 in FIG. 14, regarding limiting the current flowing through the battery pack. In step S301 of FIG. 15A, the absolute value of the current is compared to the allowable average current characteristic information. If the absolute value of the current is less than or equal to the allowable average current characteristic information (S301=NO), then no action is taken. If the absolute value of the current is greater than the allowable average current characteristic information (S301=YES), then the method proceeds to step S302, where the allowable average current characteristic information is compared to a predetermined average value. If the allowable average current characteristic information is less than the predetermined average value (S302=YES), then the maximum value is set to the exceeded value. If not, (S302=NO), then the maximum value is set to the exceeded value minus the amount of excess.

Referring to FIG. 15B, in step S311, the allowable current is calculated using at least data from voltage measurement unit and current measurement unit. In step S312, if the allowable average current characteristic information is less than the allowable current (S312=YES), in step S313, the current flow is set to the allowable average current characteristic information. If the allowable average current characteristic information is greater than or equal to the allowable current (S312=NO), then in step S314, the current flow is set to the allowable current.

Figure 16:
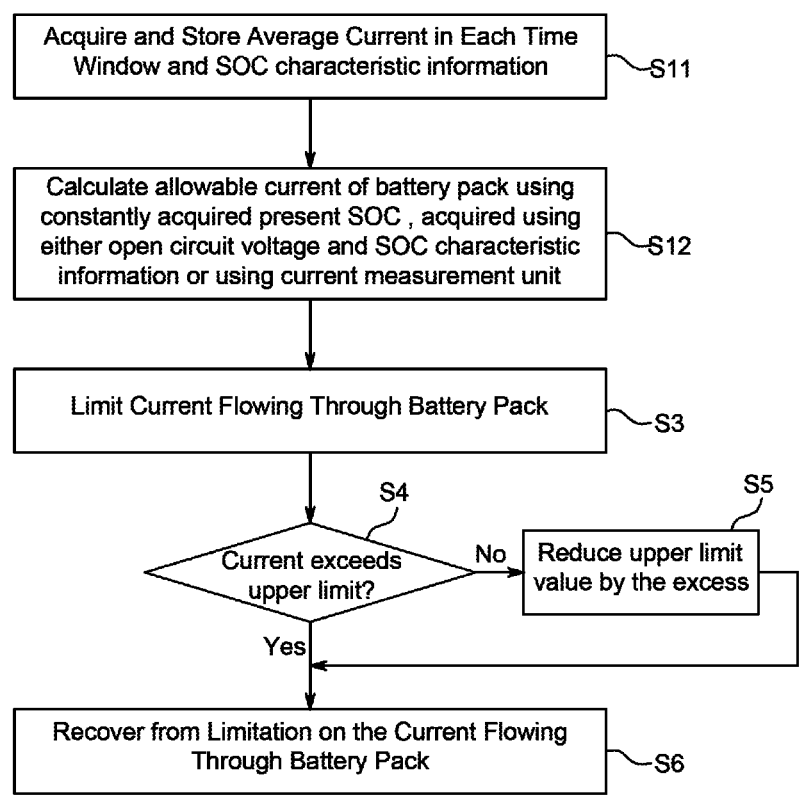
FIG. 16 is a flow diagram of the operation procedure in another embodiment of the invention.

FIG. 16 is a flow diagram of the method of operation in another embodiment. In step S11, the average current in each time window and SOC characteristic information is acquired and store, for example in the storage unit. In step S12, the allowable current of the battery pack is calculated using constantly acquired present SOC, which can be acquired using either open circuit voltage and SOC characteristic information, or using current measurement unit. Steps S3-S6 in FIG. 16 are the same as steps S3-S6 in FIG. 15 so their description is omitted.

Embodiment 2

Summary

As described above, the battery system 100 according to this Embodiment 2, if the average current for each time window width exceeds the allowable average current described in the allowable average current table 183, a current limit value obtained by subtracting the amount of the excess over the allowable average current is set. Thus, the average current is settled at or below the allowable average current and charge-discharge control of the battery pack 110 in consideration of the excess current can be realized.

Embodiment 3

In this embodiment, a change is made to the average current monitoring unit 152 provided in the battery pack control unit 150. In Embodiment 1, the average value of the absolute values of the currents flowing in and out of the battery pack 110 in each window width is found, and if the average value exceeds the allowable average current, the allowable average current is set as the current limit value. Here, the allowable average current X1 with respect to the window time of 1 second is used as the initial value of the current limit value as shown in FIG. 11, and if the average current found with respect to the window time of 2 seconds exceeds the allowable average current X2 corresponding to the window time of 2 seconds, the current limit value is changed from the initial value X1 to X2. Therefore, the current flowing in and out of the battery pack 110 can be reduced. However, if an average current exceeding the allowable average current X1 for the window time of 1 second is obtained, the current limit value is changed from the initial value X1 to the allowable average current X1. That is, consequently the current limit value is not changed and therefore the charging and discharging currents of the battery pack 110 cannot be limited to a small value.

Thus, in this embodiment, if an average current exceeding the allowable average current X1 with respect to the window time of 1 second is obtained, the processing described in Embodiment 2 is carried out and the current limit value is decided in consideration of the amount by which the allowable average current is exceeded.

Specifically, as shown in the formula 4, if an average current exceeding the allowable average current X1 for the window time of 1 second is detected, the result of reducing X1 by the amount by which the average current exceeds the allowable average current X1 is set as the current limit value. Thus, if the allowable average current X1 is exceeded, changing the initial current limit value X1 to X1, that is, a situation where the current limit value is not actually changed, can be avoided.

The processing to set a current limit value by subtracting the amount by which the allowable average current is exceeded in the case where an average current exceeding the allowable average current is detected, described in Embodiment 2, can be applied not only to the allowable average current X1 but also extensively to X2 and X3. If an average current exceeding an allowable average current below a threshold value is detected, the processing described Embodiment 1 (setting the allowable average current as the current limit value) may be executed, and if an average current exceeding an allowable average current equal to or above the threshold value is detected, the processing described in Embodiment 2 (setting a current limit value reflecting the amount by which the allowable average current is exceeded) may be executed.

In this embodiment, the battery system 100 in which the method for setting the current limit value is changed according to the allowable average current and in which the current flowing in and out of the battery pack 110 can be limited to a small value, can be provided.

Embodiment 4

Figure 13:
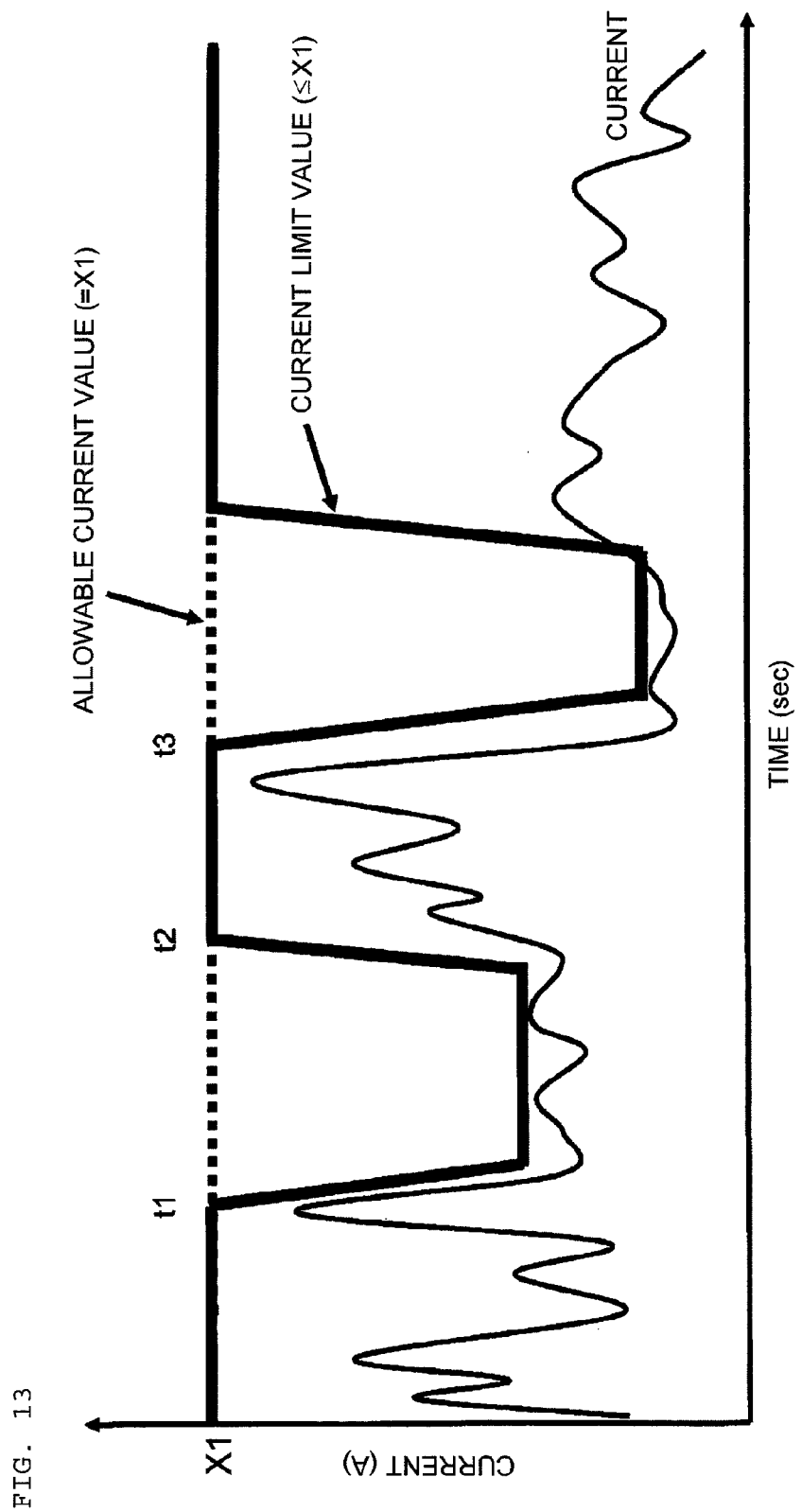
FIG. 13 is a view showing processing in which the battery pack control unit 150 limits the battery current.

FIG. 13 is a view showing the state where the average current monitoring unit 152 provided in the battery pack control unit 150 is limiting the battery current. While FIG. 9 of Embodiment 1 descries that the current limit value set by the average current monitoring unit 152 is switched instantaneously, the current limit value may be changed gently with a certain gradient as shown in FIG. 13. Also, gradients may be provided for both the case of switching the current limit value to a lower value and the case of switching the current limit value to a higher value. Alternatively, the degree of gradient may be changed between the case of switching to a lower value and the case of switching to a higher value, or a gradient may be provided for just one case.

The invention made by the present inventor is specifically described above, based on the embodiments. However, the invention is not limited to the above embodiments. As a matter of course, various changes can be made without departing for the scope of the invention.

Also, it is possible to realize each of the above configurations, functions, processing units and the like as hardware, for example, by designing these on an integrated circuit, or to realize them as software by a processor executing a program that realizes each function. Information of the program, table and the like to realize each function can be stored in a storage device such as a memory or hard disk, or a storage medium such as an IC card or DVD.

REFERENCE SIGNS LIST

100: battery system, 110: battery pack, 111: single battery, 112: single battery group, 120: single battery management unit, 121 single battery control unit, 122: voltage detection circuit, 123: control circuit, 124: signal input-output circuit, 125: temperature detection unit, 130: current detection unit, 140: voltage detection unit, 150: battery pack control unit, 160: signal communication means, 170: insulation element, 180: storage unit, 181: SOC table, 182: internal resistance table, 183: allowable average current table, 200: vehicle control unit, 300 to 330: relay, 400: inverter, 410: motor generator, 420: charger.

The invention claimed is:
1. A battery control device comprising:
a control unit which controls a battery pack in which a plurality of single batteries are connected;
a current measurement unit which measures a current flowing through the single batteries or the battery pack; and
a storage unit in which allowable average current characteristic information expressing an upper limit value of an average value of absolute values of the current in a plurality of different time window widths, for each of the time window widths, is stored,
wherein the control unit controls the current by sending a command to the charger via one or more relays, and
if the current exceeds the upper limit value stored in the storage unit, the control unit controls the current by reducing the upper limit value stored in the storage unit by the amount of the excess,
the control unit controls the current such that the average value of the absolute values of the current found for each of the time window widths settles to or below the upper limit of the average value for each of the time window widths expressed by the allowable average current characteristic information, and
if the average value of the absolute values of the current found for each of the time window widths exceeds the average value for each of the time window widths expressed by the allowable average current characteristic information, the control unit controls the current by reducing the average value for each of the time window widths by the amount of the excess,
wherein the control unit
compares the average value of the absolute values of the current found for each of time window widths, with the average value for each of time window widths expressed by allowable average current characteristic information, and if the value corresponding to one of the time window widths is exceeded,
determines whether the average value expressed by allowable average current characteristic information corresponding to the exceeded time window width is equal to or greater than a predetermined average value or not, if the average value expressed by the exceeded allowable average current characteristic information is smaller than the predetermined average value, controls the current in such a way that the exceeded value corresponding to the time window width, of the average value for each of the time window widths expressed by the allowable average current characteristic information, becomes a maximum value of the current, and if the average value expressed by the exceeded allowable average current characteristic information is equal to or greater than the predetermined average value, controls the current in such a way that a value obtained by subtracting the amount of the excess from the exceeded value corresponding to the time window width, of the average value for each of the time window widths expressed by the allowable average current characteristic information, becomes a maximum value of the current.

2. The battery control device according to claim 1, characterized in that the control unit compares the average value of the absolute values of the current found for each of time window widths, with the average value for each of time window widths expressed by allowable average current characteristic information, and if the value corresponding to one of the time window widths is exceeded, controls the current in such a way that the exceeded value corresponding to the time window width, of the average value for each of the time window widths expressed by allowable average current characteristic information, becomes a maximum value of the current.

3. The battery control device according to claim 1, characterized in that the allowable average current characteristic information describes a maximum average value as a value corresponding to the time window width that is the shortest.

4. The battery control device according to claim 1, characterized in that a short-time rated current value of one or more components for forming the battery control device is described in the allowable average current characteristic information.

5. The battery control device according to claim 1, characterized in that a short-time rated current value of one or more components for forming the battery control device is described in allowable average current characteristic information.

6. The battery control device according to claim 1, characterized by further comprising a voltage measurement unit which measures an inter-terminal voltage of the single batteries and the battery pack, wherein the control unit calculates an allowable current of the single batteries based on at least measurement information from the voltage measurement unit and the current measurement unit, and controls the current in such a way that the current flowing through the single batteries or the battery pack becomes equal to or lower than the smaller one of a current found from the allowable average current characteristic information and the allowable current.

7. The battery control device according to claim 1, characterized in that the storage unit stores SOC characteristic information describing correspondence between an open circuit voltage and state of charge of the single batteries, and the control unit constantly acquires a present state of charge of the single batteries or the battery pack, using an open circuit voltage of the single batteries or the battery pack that is measured or estimated and the SOC characteristic information, or constantly acquires the present state of charge of the single batteries or the battery pack by integrating the current flowing through the battery pack measured by the current measurement unit, and uses the value thereof to calculate an allowable current of the battery pack.

8. A battery system characterized by comprising:

the battery control device according to claim 1; and a battery pack in which plural single batteries are connected;

wherein the battery control device controls the single batteries or the battery pack.

* * * * *